United States Patent
Lafaye et al.

(10) Patent No.: US 10,232,508 B2
(45) Date of Patent: Mar. 19, 2019

(54) OMNIDIRECTIONAL WHEELED HUMANOID ROBOT BASED ON A LINEAR PREDICTIVE POSITION AND VELOCITY CONTROLLER

(71) Applicants: SOFTBANK ROBOTICS EUROPE, Paris (FR); INSTITUT NATIONAL DE LA RECHERCHE EN INFORMATIQUE ET EN AUTOMATIQUE, Rocquencourt (FR)

(72) Inventors: Jory Lafaye, Paris (FR); Cyrille Collette, Le Plessis Robinson (FR); Pierre-Brice Wieber, Grenoble (FR)

(73) Assignees: SOFTBANK ROBOTICS EUROPE, Paris (FR); INSTITUT NATIONAL DE RECHERCHE EN INFORMATIQUE ET EN AUTOMATIQUE, Rocquencourt (FR)

( * ) Notice: Subject to any disclaimer, the term of this patent is extended or adjusted under 35 U.S.C. 154(b) by 0 days.

(21) Appl. No.: 15/300,221

(22) PCT Filed: Apr. 17, 2015

(86) PCT No.: PCT/EP2015/058370
§ 371 (c)(1),
(2) Date: Sep. 28, 2016

(87) PCT Pub. No.: WO2015/158885
PCT Pub. Date: Oct. 22, 2015

(65) Prior Publication Data
US 2017/0144299 A1    May 25, 2017

(30) Foreign Application Priority Data
Apr. 17, 2014 (EP) .................................. 14305585

(51) Int. Cl.
*G05D 1/00* (2006.01)
*B25J 9/16* (2006.01)
(Continued)

(52) U.S. Cl.
CPC ............... *B25J 9/162* (2013.01); *B25J 5/007* (2013.01); *B25J 9/1628* (2013.01); *G05D 1/0891* (2013.01); *G05D 2201/0217* (2013.01)

(58) Field of Classification Search
USPC .................................................. 700/245–264
See application file for complete search history.

(56) References Cited

U.S. PATENT DOCUMENTS

| 4,638,445 A | * | 1/1987 | Mattaboni | ............... B25J 9/0003 180/168 |
| 5,432,417 A | * | 7/1995 | Takenaka | ............... B62D 57/032 180/8.6 |

(Continued)

OTHER PUBLICATIONS

A. Mills et al., "Nonlinear model predictive control of an inverted pendulum," American Control Conference, Jun. 10, 2009, pp. 2335-2340, XP031486943.

(Continued)

*Primary Examiner* — Jonathan L Sample
(74) *Attorney, Agent, or Firm* — Baker & Hostetler LLP

(57) ABSTRACT

A humanoid robot with a body joined to an omnidirectional mobile ground base, equipped with: a body position sensor, a base position sensor and an angular velocity sensor to provide measures, actuators comprising at least 3 wheels located in the omnidirectional mobile base, extractors for converting sensored measures into useful data, a supervisor to calculate position, velocity and acceleration commands from the useful data, means for converting commands into instructions for the actuators, wherein the supervisor comprises: a no-tilt state controller, a tilt state controller and a landing state controller, each controller comprising means (Continued)

for calculating, position, velocity and acceleration commands based on a double point-mass robot model with tilt motion and on a linear model predictive control law, expressed as a quadratic optimization formulation with a weighted sum of objectives, and a set of predefined linear constraints.

11 Claims, 5 Drawing Sheets

(51) Int. Cl.
*B25J 5/00* (2006.01)
*G05D 1/08* (2006.01)

(56) References Cited

U.S. PATENT DOCUMENTS

| | | | | |
|---|---|---|---|---|
| 6,317,652 | B1* | 11/2001 | Osada | B25J 19/023 318/568.1 |
| 6,604,022 | B2* | 8/2003 | Parker | G06N 3/008 359/265 |
| 7,584,020 | B2* | 9/2009 | Bruemmer | G06N 3/008 318/567 |
| 7,587,260 | B2* | 9/2009 | Bruemmer | G05D 1/0088 318/567 |
| 7,620,477 | B2* | 11/2009 | Bruemmer | G06N 3/008 180/167 |
| 7,668,621 | B2* | 2/2010 | Bruemmer | G05D 1/0088 318/568.12 |
| 7,801,644 | B2* | 9/2010 | Bruemmer | G06N 3/008 318/568.17 |
| 7,873,448 | B2* | 1/2011 | Takeda | G06T 7/20 700/253 |
| 7,974,738 | B2* | 7/2011 | Bruemmer | G05D 1/0088 318/568.12 |
| 8,073,564 | B2* | 12/2011 | Bruemmer | G05D 1/0027 700/245 |
| 8,077,963 | B2* | 12/2011 | Wang | B25J 5/007 382/153 |
| 8,234,010 | B2* | 7/2012 | Thompson | G05D 1/0227 318/568.16 |
| 8,271,132 | B2* | 9/2012 | Nielsen | B25J 9/161 318/568.17 |
| 8,355,818 | B2* | 1/2013 | Nielsen | G05D 1/0088 340/628 |
| 8,489,234 | B2* | 7/2013 | Rew | A47L 9/009 318/568.12 |
| 8,632,376 | B2* | 1/2014 | Dooley | A63F 9/143 273/246 |
| 8,718,837 | B2* | 5/2014 | Wang | B25J 9/1689 701/2 |
| 8,935,005 | B2* | 1/2015 | Rosenstein | B25J 11/009 700/245 |
| 8,965,578 | B2* | 2/2015 | Versteeg | G06N 3/004 700/258 |
| 9,323,250 | B2* | 4/2016 | Wang | G05D 1/028 |
| 9,498,886 | B2* | 11/2016 | Rosenstein | B25J 5/007 |
| 9,902,069 | B2* | 2/2018 | Farlow | B25J 11/009 |
| 9,975,248 | B2* | 5/2018 | Stephens, Jr. | B25J 11/00 |
| 2002/0013641 | A1* | 1/2002 | Nourbakhsh | G05D 1/0214 700/245 |
| 2002/0198626 | A1* | 12/2002 | Imai | G06N 3/008 700/245 |
| 2003/0016726 | A1* | 1/2003 | Pavlidis | A61B 5/015 374/45 |
| 2004/0140404 | A1* | 7/2004 | Ohta | B64C 33/00 244/190 |
| 2007/0016328 | A1* | 1/2007 | Ziegler | A47L 5/14 700/245 |
| 2007/0156286 | A1* | 7/2007 | Yamauchi | G05D 1/0038 700/245 |
| 2007/0192910 | A1* | 8/2007 | Vu | B25J 5/007 700/245 |
| 2007/0198128 | A1* | 8/2007 | Ziegler | B25J 5/007 700/245 |
| 2007/0234492 | A1* | 10/2007 | Svendsen | A47L 5/30 15/21.1 |
| 2007/0255115 | A1* | 11/2007 | Anglin, Jr. | G06F 19/00 600/300 |
| 2008/0086236 | A1* | 4/2008 | Saito | G01S 5/0252 700/245 |
| 2008/0316368 | A1* | 12/2008 | Fritsch | H04N 5/23203 348/722 |
| 2009/0030552 | A1* | 1/2009 | Nakadai | G06N 3/008 700/258 |
| 2009/0210090 | A1* | 8/2009 | Takemitsu | B25J 9/1661 700/245 |
| 2010/0030378 | A1* | 2/2010 | Choi | G01S 1/54 700/245 |
| 2010/0037418 | A1* | 2/2010 | Hussey | A47L 5/30 15/319 |
| 2010/0063636 | A1* | 3/2010 | Matsumoto | F24F 11/30 700/276 |
| 2010/0153317 | A1* | 6/2010 | Lee | B25J 9/1661 706/12 |
| 2010/0243344 | A1* | 9/2010 | Wyrobek | B25J 5/007 180/21 |
| 2011/0071672 | A1* | 3/2011 | Sanders | B25J 9/161 700/245 |
| 2011/0231050 | A1* | 9/2011 | Goulding | B62D 57/024 701/26 |
| 2012/0182392 | A1* | 7/2012 | Kearns | B25J 11/009 348/46 |
| 2012/0185095 | A1* | 7/2012 | Rosenstein | B25J 5/007 700/259 |
| 2013/0035790 | A1* | 2/2013 | Olivier, III | G05D 1/0246 700/246 |
| 2013/0166137 | A1* | 6/2013 | Ahn | G06F 11/30 701/32.3 |
| 2013/0226340 | A1* | 8/2013 | Buchstab | B25J 5/04 700/245 |
| 2014/0254896 | A1* | 9/2014 | Zhou | B25J 9/0006 382/124 |
| 2016/0358276 | A1* | 12/2016 | Stephenson | G06F 19/00 |
| 2017/0106738 | A1* | 4/2017 | Gillett | B60K 7/0007 |
| 2017/0144299 | A1* | 5/2017 | Lafaye | G05D 1/0891 |

OTHER PUBLICATIONS

H. Fukushima et al., "Transformation Control to an Inverted Pendulum for a Mobile Robot with Wheel-Arms Using Partial Linearization and Polytopic Model Set," IEEE Transactions on Robotics, vol. 29, No. 3, Jun. 1, 2013, pp. 774-783, XP011516629.

Andrei Herdt et al., "Walking without thinking about it," Proceedings of the IEEE/RSJ International Conference on Intelligent Robots and Systems, Nov. 2010.

David Gouaillier et al., "Omni-directional Closed-loop Walk for NAO," 2010 IEEE-RAS International Conference on Humanoid Robots, Dec. 6-8, 2010, pp. 448-454.

* cited by examiner

OMNIDIRECTIONAL WHEELED HUMANOID ROBOT BASED ON A LINEAR PREDICTIVE POSITION AND VELOCITY CONTROLLER

CROSS-REFERENCE TO RELATED APPLICATIONS

This application is a National Stage of International patent application PCT/EP2015/058370, filed on Apr. 17, 2015, which claims priority to foreign European patent application No. EP 14305585.3, filed on Apr. 17, 2014, the disclosures of which are incorporated by reference in their entirety.

FIELD OF THE INVENTION

The present invention relates to the field of robot programming systems. More specifically, it applies to the controlling of motions of robots which move around on articulated limbs or use them, notably robots of human or animal form. A robot can be qualified as humanoid from the moment when it has certain human appearance attributes: a head, a trunk, two arms, two hands, etc. A humanoid robot may, however, be more or less sophisticated. Its limbs may have a greater or lesser number of articulations. It may control its own balance statically and dynamically and roll over a base. It may pick up signals from the environment ("hear", "see", "touch", "sense", etc.) and react according to more or less sophisticated behaviors, and interact with other robots or humans, either by speech or by gesture. For a current generation of humanoid robots, programmers are capable of creating scenarios, which can be more or less sophisticated, as sequences of events/actions reacted to/performed by the robot. These actions can be conditional upon certain behaviors of people who interact with the robot. But in these humanoid robots of the first generation, application programming is done in a development toolkit and each application needs to be launched by a triggering event, the occurrence of which has been included in the application.

There is therefore a need for a humanoid robot capable of living an "autonomous life", as a human being does, who is capable of behaving in a determined manner, depending on the environment he is evolving in. It is an object of the present invention to overcome the limitations of the robots of the prior art by providing a robot which is capable of determining autonomously sequences of its life adapted to the context it is evolving in, without any intervention of a programmer.

BACKGROUND

We consider a robot with a mobile base joined to a body, also called upper body.

In standard behavior, the robot is in contact with all of its wheels, and dynamically stable while the Center of Pressure (CoP) which is the barycenter of the forces acting between the ground and the robot, is strictly inside the convex hull defined by its wheel contact points. In absence of disturbance, this CoP constraint is always respected. However, when disturbances appear, the CoP can be on the bounds of the support hull. In that case, the robot can start to tilt, and if nothing is done, it can fall. So our problem is to control the robot over two dynamic models: when the robot is not tilting, and when it is.

When the robot is not tilting, we can found some papers about controlling a mobile robot with dynamic stability constraints, or about controlling a humanoid two-legged robots.

Some recent works deal with controlling a robot with dynamical constraints, caused by limbs such as a manipulator arm. K. Mingeuk and al. have worked on the stabilization of a wheeled platform using dynamic constraints: "Stabilization of a rapid four-wheeled mobile platform using the zmp stabilization method". They use a direct linear quadratic regulator (LQR) method to control the platform. The inconvenient of this method is that the submitted dynamic constraints require having the CoP (Center of Pressure) on the middle of the platform. The CoP is the barycenter of the contact forces between the robot and the ground. This method involves losing several DoF (Degree of Freedom): indeed, to prevent a robot from falling, the CoP needs to be only in the convex polygon defined by the contact points between the wheels and the ground.

In another paper, Y. Li and al. present a simple controller of a mobile robot with dynamic constraints: "The dynamic stability criterion on the wheel-based humanoid robot based on zmp modeling". The difference with the K. Mingeuk and A I. publication is that it takes into account the full CoP constraint, which is a sum of inequality constraints. This controller is a pid-control iterated on a complete model of the robot to find a torque command where the CoP is in the support polygon.

Concerning humanoid robotics, P. B. Wieber, H. Diedam and A. Herdt have described a method to control humanoid two-legged robot with highly constrained dynamic: "Walking without thinking about it". This most recent approach concerns the linear predictive control based on a 3d linear inverted pendulum model. Using a simple model of the robot, this control law predicts the dynamic of its state in the future, in order to ensure that the current command sent to the robot will not cause an inevitable fall in a few seconds. Concerning the biped humanoid robot NAO, an implementation of this control law can be found in a paper written by D. Gouaillier, C. Collette and K. Kilner: "Omni-directional closed-loop walk for NAO". But the robot NAO is small and this method would not give good results notably for a higher humanoid robot as shown FIG. 1, for instance with the following features:

- 20 Degrees of freedom (DoF) (2 DoF on the head 160, 2×6 DoF on the arms 170, 3 DoF on the leg 180 and 3 DoF in the mobile base 140),
- 1.37 m height 110,
- 0.65 m width 130,
- 0.40 m depth 120,
- 30 kg total mass,
- one leg 180 linked to the omnidirectional base 140 with three wheels 141. The mobile base has a triangular shape of 0.422 m length and is able to move the robot at a maximum velocity of 1:4 m/s$^{-1}$ and acceleration of 1:7 m/s$^{-2}$ for a short time. The nominal velocity and acceleration are 0:5 m/s$^{-1}$ and 1:0 m/s$^{-2}$.

Concerning the case when the robot is tilting, we can link this problem with the control of one or two wheeled mobile robot. However, in our case, we do not want to control the robot around an unstable equilibrium direction (generally the vertical), like all one or two wheeled mobile robots. Many papers can be found about controlling these robots. They are based on different types of control like:

PID force control as described in the publication by J. K. Ahn and S. J. Lee, «Force control application to a mobile manipulator with balancing mechanism,» 2010, Linear Quadratic Regulator as described in the publication by X. Changkai, L. Ming, and P. Fangyu, "The system design and lqr control of a two-wheels self-balancing mobile robot," 2011. or Sliding Mode Control as described in the publication by K. Sho-Tsung, C. Wan-Jung, and H. Ming-Tzu, "Balancing of a spherical inverted pendulum with an omni-directional mobile robot," IEEE Multi-conference on Systems and Control, 2013.

All of these controllers have for objective to control the robot around an unstable equilibrium direction, depending on gravity and on external forces.

Concerning humanoid robotic, we can found some papers about push recovering. The main concepts are to manage over four possibilities of control:

move the CoP using the upper bodies,
create a torque using the ankle of the foot,
create some angular momentums using the arms, and
do some steps.

They cannot be applied in our case because they strongly depend on the bipedal mechanic, which implies that the feet cannot roll or slip on the ground, and that they can do some step to recover from a push. In our case, the CoP cannot be displaced because there is no surface of contact on the tilt direction. Also another difficulty of our problem is to take into account the discrete switch of the dynamic model (presence or absence of some contact forces). This implies that some impact can occur. Generally, manage with impact is a hard question for real-time control.

There is therefore a need for controlling both the mobile base of a humanoid robot and its body, while taking into account their dynamical constraints and that the robot can be strongly disturbed and can tilt around its wheels.

So, instead of proposing a unique controller which will be valid in the different possible dynamical states, we define two controllers, one when the robot is not tilting, and one when it is. In order to ensure a correct and smooth transition between the two controllers, a third controller is defined to deal with a landing phase and a supervisor is defined to address them accordingly.

SUMMARY OF THE INVENTION

To this effect, the invention provides a humanoid robot with a body joined to an omnidirectional mobile ground base, equipped with:

a body position sensor, a base position sensor and an angular velocity sensor to provide measures,
actuators comprising joints motors and at least 3 wheels located in the omnidirectional mobile base,
extractors for converting sensored measures into useful data,
a supervisor to calculate position, velocity and acceleration commands from the useful data,
means for converting commands into instructions for the actuators.

It is mainly characterized in that the supervisor comprises:
a no-tilt state controller, a tilt state controller and a landing state controller, each controller comprising means for calculating from the useful data, pre-ordered position and velocity references, and a tilt angle and angular velocity references set to 0, position, velocity and acceleration commands based on a double point-mass robot model with tilt motion and on a linear model predictive control law with a discretized time according to a sampling time period T and a number N of predicted samples, expressed as a quadratic optimization formulation with a weighted sum of objectives, and a set of predefined linear constraints,
an impact angular velocity and a landing impact time estimator and means for choosing a controller according to an estimated impact angular velocity and useful angular velocity.

The advantage of this robot is to be robust to many types of disturbances. They can be short, long, fast or multiple, with great dynamic bandwidth. We make no hypothesis about the disturbances. Moreover, in case of a very strong disturbance which cannot be recovered from, a fall manager strategy has been implemented on the robot, to minimize the impact of the body with the ground.

More precisely, the advantages of this robot are firstly to be able to recover from a strong disturbance which makes the robot tilt. The second advantage is to control a non-linear dynamic, with discrete change and impact in a simple and real-time way. The third advantage is to be able to define many behaviors of the robot by tuning the parameters of the supervisor as choosing to more limit the mechanical impact, or to limit the travelled distance during the tilt recovery.

According to an embodiment of the invention, the estimated impact angular velocity is calculated by integration of a constant.

There can be no tilt in the robot model; the no-tilt controller can be able for instance to calculate position, velocity and acceleration commands from the useful data using pre-ordered references, with the following objectives:
a base position objective,
a base velocity objective,
an objective related to the distance between the CoP and the base center, CoP being the barycenter of contact forces between the robot and the ground,
and with the following constraints:
a maximum velocity and acceleration of the mobile base,
kinematic limits of the body,
a CoP limit.

The tilt controller can be able to calculate position, velocity and acceleration commands from the useful data using pre-ordered references and a tilt angle and angular velocity references set to 0, and with objectives that are tilt angle minimization and angular velocity minimization and with constraints that are kinematic limits of the mobile base, kinematic limits of the body, a positive tilt angle and a move of the body only on the angular velocity axis.

A weighted numerical stability objective can be added to the weighted sum of objectives.

The landing controller can be able to calculate position, velocity and acceleration commands from the useful data using pre-ordered references and a tilt angle and angular velocity references set to 0, with objectives that are an objective related to the distance between the CoP and the base center, CoP being the barycenter of contact forces between the robot and the ground, and a numerical stability objective, and with constraints that are a maximum velocity and acceleration of the mobile base and kinematics limits of the body and a CoP limit and a move of the body only on the angular velocity axis.

A base velocity objective can be added to the weighted sum of these objectives.

The kinematics limits of the body can be null.

According to an embodiment of the invention, at least a wheel is omnidirectional.

Advantageously, the ground is planar and horizontal.

The invention also provides a method for controlling a humanoid robot with a body joined to an omnidirectional mobile ground base, implemented at pre-defined sampling times and comprising:

retrieving position measure of the body, position measure of the base, tilt angle of the robot and angular velocity measure of the robot, converting these measures in useful data, using the useful data, and according to a state of the robot, calculating position, velocity and acceleration commands using a control law based on a linear model predictive control law with a discretized time according to a sampling time period and a number of predicted samples, and expressed as a quadratic optimization formulation with a weighted sum of objectives with predefined weights and a set of linear constraints, converting these commands into instructions for the robot actuators.

The state of the robot can be defined according to the following steps:

if one among the tilt angle measure or/and the angular velocity measure is greater than zero, estimate an estimated impact angular velocity and an estimated impact time, initially, the robot is in a no-tilt state, No-tilt state:
If there is no estimated impact time, switch to a tilt state;
If the impact angular velocity is above a pre-defined limit1, switch to the tilt state;
If the measured angular velocity is above a pre-defined limit2, switch to the tilt state;
Else, if the tilt angle is not null, switch to a landing state,
if the tilt angle is null stay in the no-tilt state.

Tilt state:
If the measured angular velocity is above the pre-defined limit2, stay in tilt state.
If the estimated impact velocity is under a pre-defined limit1, switch to the landing state
Else, stay in tilt state.

Landing state:
If there is no estimated impact time, switch to the tilt state;
If the impact angular velocity is above a pre-defined limit1, switch to the tilt state;
If the measured angular velocity is above a pre-defined limit2, switch to the tilt state;
If the tilt angle falls to 0, and if an angular velocity measured at a next time is null, switch to the non-tilt state, else, stay in the landing state.

The invention also provides a computer program comprising computer code fit for executing when running on a computer the method as described.

BRIEF DESCRIPTION OF THE DRAWINGS

The invention will be better understood and its various features and advantages will emerge from the following description of a number of exemplary embodiments and its appended figures in which.

From a figure to another one, the same elements are tagged with the same references.

DETAILED DESCRIPTION

Figure 1:
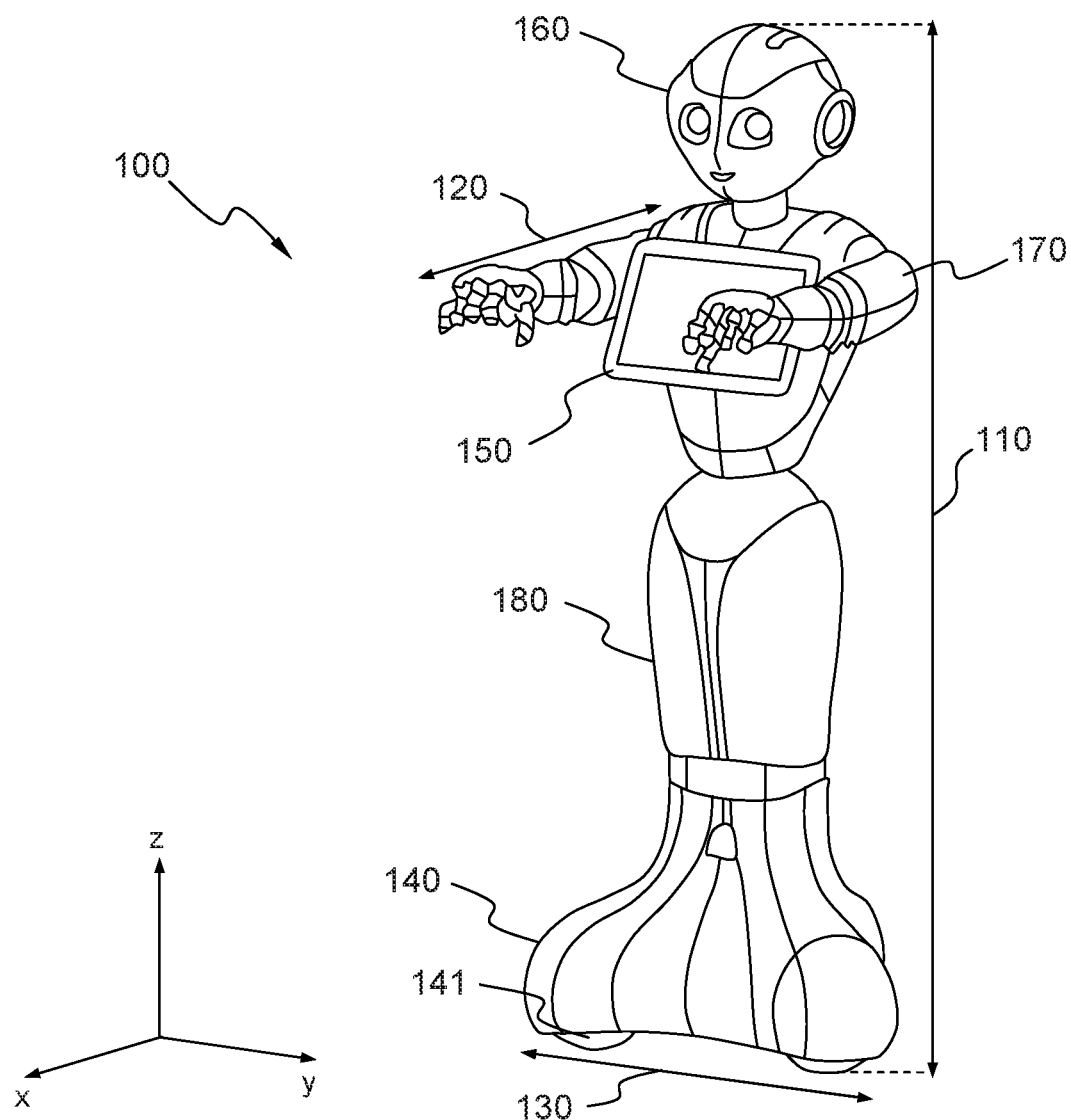
FIG. 1 displays a physical architecture of a humanoid robot in a number of embodiments of the invention.

FIG. 1 displays a physical architecture of a humanoid robot in a number of embodiments of the invention.

The specific robot 100 in the figure is taken as an example only of a humanoid robot in which the invention can be implemented. The lower limb 180 of the robot in the figure is not functional for walking, but can move in any direction on its base 140 which rolls on the surface on which it lays. By way of example, this robot has a height 110 which can be around 120 cm, a depth 120 around 65 cm and a width 130 around 40 cm. In a specific embodiment, the robot of the invention has a tablet 150 with which it can communicate messages (audio, video, web pages) to its environment, or receive entries from users through the tactile interface of the tablet. In addition to the processor of the tablet, the robot of the invention also uses the processor of its own motherboard, which can for example be an ATOM™ Z530 from Intel™. The robot of the invention also advantageously includes a processor which is dedicated to the handling of the data flows between the motherboard and actuators which control the motors of the joints in a limb and the balls that the robot uses as wheels, in a specific embodiment of the invention. The motors can be of different types, depending on the magnitude of the maximum torque which is needed for a definite joint. For instance, brush DC coreless motors from e-Minebea™ (SE24P2CTCA for instance) can be used, or brushless DC motors from Maxon™ (EC45_70W for instance). The MREs are preferably of a type using the Hall effect, with 12 or 14 bits precision.

In embodiments of the invention, the robot displayed in FIG. 1 also comprises various kinds of sensors. Some of them are used to control the position and movements of the robot. This is the case, for instance, of an inertial unit, located in the torso of the robot, comprising a 3-axes gyrometer and a 3-axes accelerometer. The robot can also include two 2D color RGB cameras on the forehead of the robot (top and bottom) of the System On Chip (SOC) type, such as those from Shenzen V-Vision Technology Ltd™ (OV5640), with a 5 megapixels resolution at 5 frames per second and a field of view (FOV) of about 57° horizontal and 44° vertical. One 3D sensor can also be included behind the eyes of the robot, such as an ASUS XTION™ SOC sensor with a resolution of 0.3 megapixels at 20 frames per second, with about the same FOV as the 2D cameras. The robot of the invention can also be equipped with laser lines generators, for instance three in the head and three in the base, so as to be able to sense its relative position to objects/beings in its environment. The robot of the invention can also include microphones to be capable of sensing sounds in its environment. In an embodiment, four microphones with a sensitivity of 300 mV/Pa+/−3 dB at 1 kHz and a frequency range of 300 Hz to 12 kHz (−10 dB relative to 1 kHz) can be implanted on the head of the robot. The robot of the invention can also include two sonar sensors, possibly located at the front and the back of its base, to measure the distance to objects/human beings in its environment. The robot can also include tactile sensors, on its head and on its hands, to allow interaction with human beings.

To translate its emotions and communicate with human beings in its environment, the robot of the invention can also include:
- LEDs, for instance in its eyes, ears and on its shoulders;
- Loudspeakers, for instance two, located in its ears.

The robot of the invention may communicate with a base station or other robots through an Ethernet RJ45 or a WiFi 802.11 connection.

The robot of the invention can be powered by a Lithium Iron Phosphate battery with energy of about 400 Wh. The robot can access a charging station fit for the type of battery included.

Position/movements of the robot are controlled by its motors, using algorithms which activate the chains defined by each limb and effectors defined at the end of each limb, in view of the measurements of the sensors.

Figure 2:
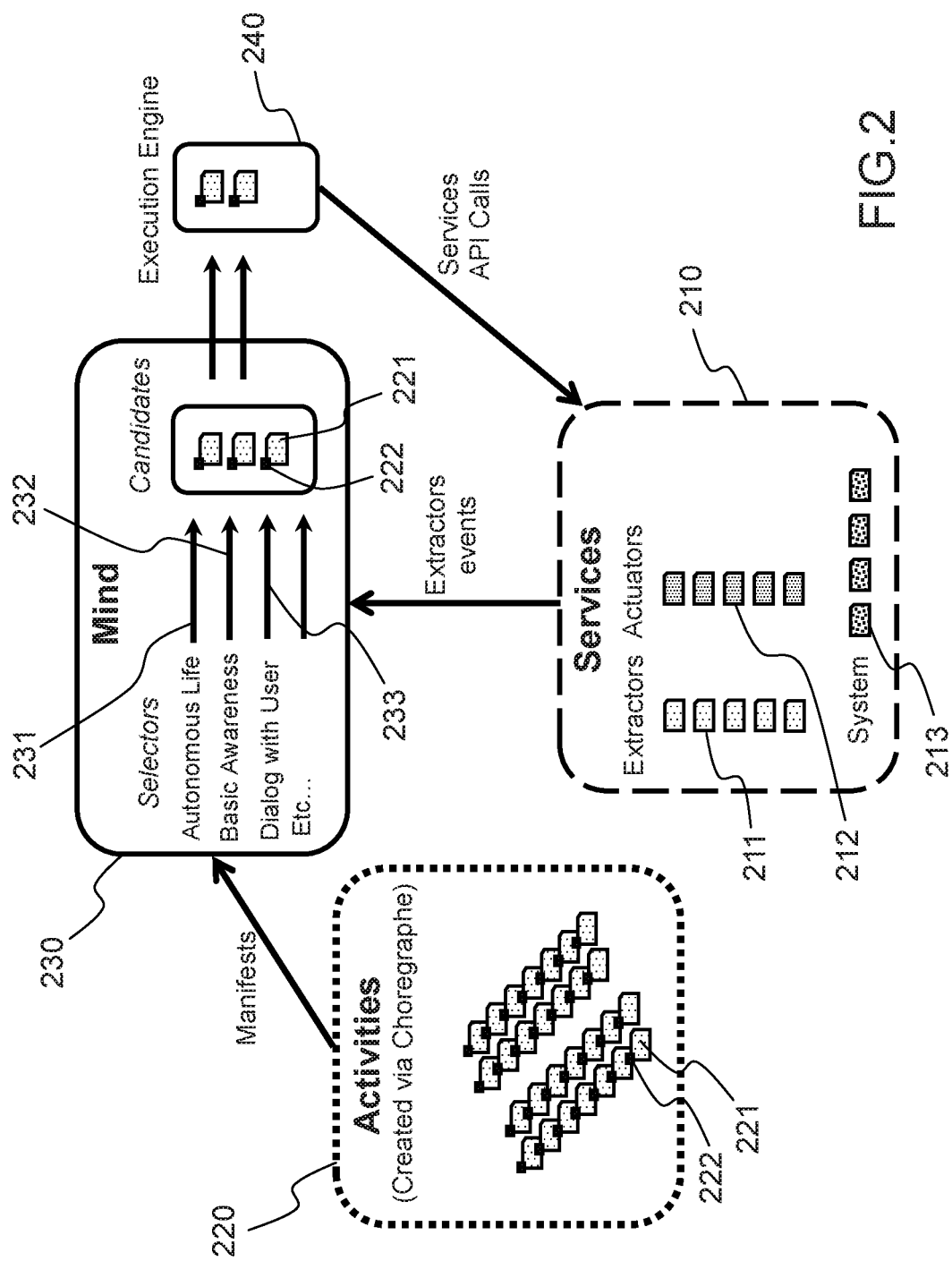
FIG. 2 displays a functional architecture of the software modules of a humanoid robot in a number of embodiments of the invention.

FIG. 2 displays a functional architecture of the software modules of a humanoid robot in a number of embodiments of the invention.

The goal of the invention is to provide a method to allow a humanoid robot to perform activities in an autonomous way, without any intervention of a programmer to anticipate the conditions that the robot will face. In the prior art, the robot is capable of executing scenarios which have been programmed and uploaded to its motherboard. These scenarios can include reactions to conditions which vary in its environment, but the robot will not be capable to react to conditions which have not been predicted and included in the code uploaded to its motherboard or accessed distantly. In contrast, the goal of the invention is to allow the robot to behave autonomously, even in view of events/conditions which have not been predicted by a programmer. This goal is achieved by the functional architecture which is displayed in FIG. 2.

This functional architecture comprises in essence four main software modules.

A Services module 210 includes services of at least three types:
  Extractor Services 211, which receives as input readings from the robot sensors of the type described in relation with FIG. 1; these sensor readings are preprocessed so as to extract relevant data (also said useful data) in relation to the position of the robot, identification of objects/human beings in its environment, distance of said objects/human beings, words pronounced by human beings or emotions thereof; example of Extractor Services are: People Perception to perceive the presence of human beings in the vicinity of the robot, Movement Detection to detect the movements of these human beings; Sound Localization to locate a sound, Touch Detection to interpret a touch on a robot tactile sensor, Speech Recognition, Emotion Recognition, to identify the emotion expressed by a human being in the vicinity of the robot, through its words or gestures;
  Actuator Services 212, which control physical actions of the robot such as Motion to activate the motors of the joints or the base, Tracker to follow motion of a human being in the environment of the robot, lighting of the robot's LEDs to communicate emotions, Animated Speech (combinations of speech and gestures), Behaviors; behaviors are a combination of movements, words, lightings which may express emotions of the robot and allow it to perform complex actions;
  System Services 213, which notably include Data Services; Data Services provide stored data, either transiently or long-term; examples of Data Services are:
    User Session Service, which stores user data, and their history of what they have done with the robot;
    Package Manager Service, which provides a scalable storage of procedures executed by the robot, with their high level definition, launching conditions and tags.

An Activities module 220 includes behaviors 221 of the robot which have been preprogrammed. The programming of the Behaviors can be effected using a graphical integrated development environment (Choregaphe™) which is the object of a European patent application published under no. EP2435216, which is assigned to the applicant of this patent application. Behaviors programmed with Choregaphe™ combine a time based logic and an event based logic. Each Behavior is tagged with a Manifest 222 which is a text file including notably the launching conditions of the Behavior. These launching conditions are based on what the extractors 211 are able to perceive.

A Mind module 230 is in charge of selecting one or several Activities to launch. To do so, the Mind subscribes to the Extractors and evaluates the launching conditions of all the installed Activities. The variables of these conditions are event based. So, efficiently, only the condition statements containing changed variables need to be reevaluated. Based on the results of the sorting algorithm, its priorities, and the life cycle (see below), Activities may be launched, and some Activities possibly stopped.

An executed Activity will rely on API (acronym of the French expression "Application Pour Interface") calls to the Services to perform the task it has been programmed to do. Whenever an Activity is on stage or stopped, the Mind collects data about when this happened, the current state of conditions, and what the user feedback seemed to be to facilitate learning.

If an existing Extractor event is not sufficient for the conditions, developers can create an additional Extractor to generate a new event, and distribute it in a package with their application.

To do so, the Mind module 230 ties together the Services and the Activities modules by controlling the selection of the Activities, and launching the Actuators based on the readings of the Extractors and on algorithms performed in the Mind called Selectors. Examples of Selectors are:
  Autonomous Life 231, which executes Activities; based on the context of a situation, the Mind can tell Autonomous Life which activity to focus on (see examples below); any Activity has full access to all call procedures of the module API; Activities can include a constraint which will direct Autonomous Life to focus on a definite Activity;
  Basic Awareness 232, which subscribes to Extractor Services such as People Perception, Movement Detection, and Sound Localization to tell the Motion Service to move; the Mind configures Basic Awareness's behavior based on the situation; at other times, Basic Awareness is either acting on its own, or is being configured by a running Activity;
  Dialog 233, which subscribes to the Speech Recognition Extractor and uses Animated Speech Actuator Service to speak; based on the context of a situation, the Mind can tell the Dialog what topics to focus on; metadata in manifests tie this information into the mind; Dialog also has its algorithms for managing a conversation and is usually acting on its own.

An Execution Engine 240 launches the API calls to invoke the Services.

The goal of the invention is more specifically to control an omnidirectional wheeled humanoid robot which can be strongly disturbed and tilt around its wheels. The method is based on two linear model predictive controllers, depending on the dynamic model of the robot and on a third controller to ensure a correct and smooth transition between the first two controllers. An estimator is designed to detect when the robot enters in a tilt dynamic, or when it returns to its nominal stable dynamic.

Figure 3:
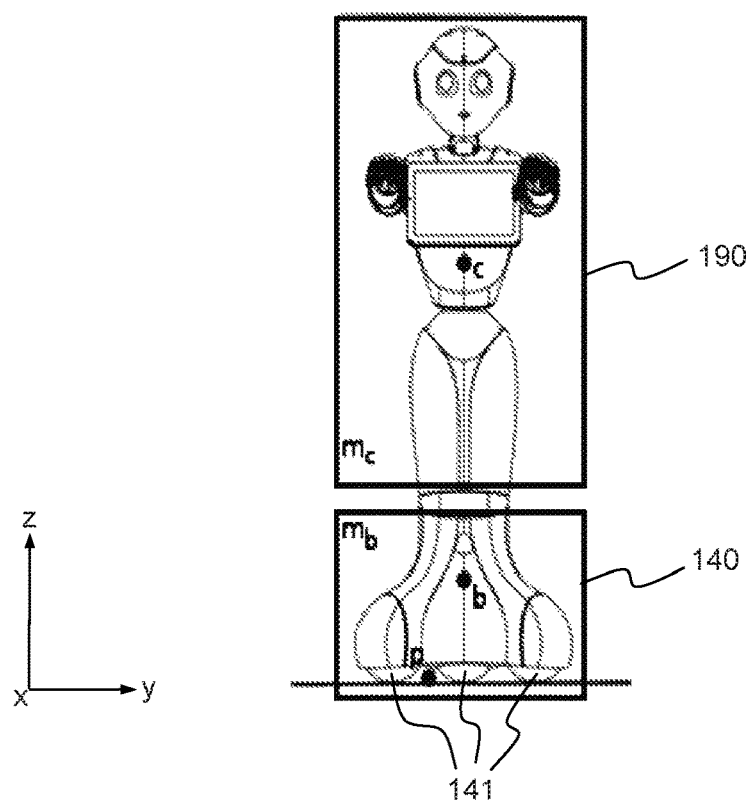
FIG. 3 displays a modelization of the mass repartition of a robot designed according to the invention, FIG. 4 displays a modelization of the tilt dynamic of a robot according to the invention.
Figure 4:
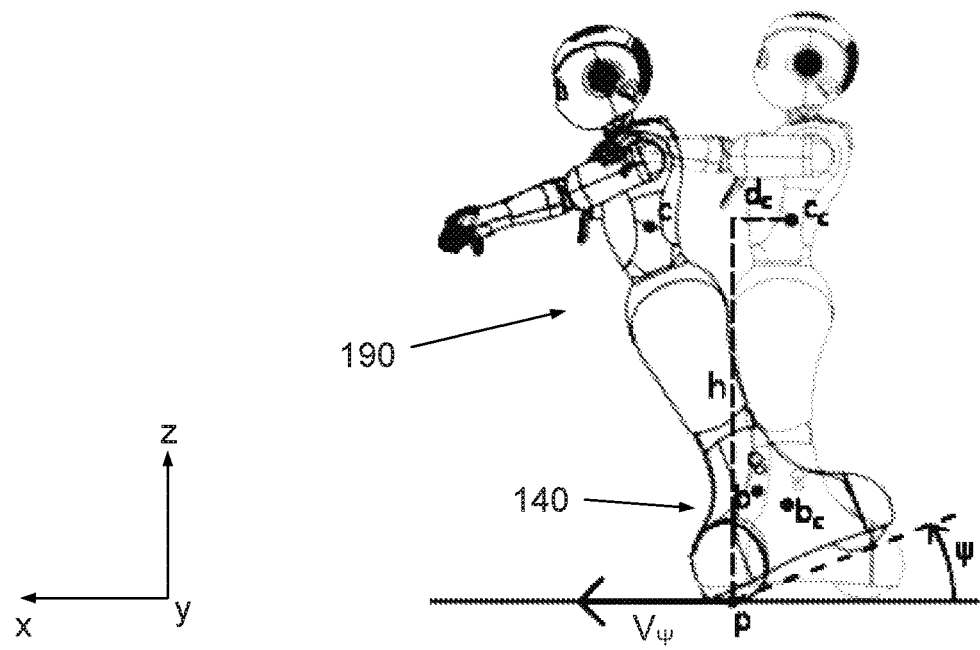

Using:

pre-ordered position and velocity references, and a tilt angle and angular velocity references set to 0, body position, base position and angular velocity data extracted from sensored measures, and called useful data, each controller calculates position, velocity and acceleration commands based on:

- a double point-mass robot model with tilt motion as shown FIGS. 3 and 4. The first point-mass b represents the mobile base Center of Mass (CoM), and the second point-mass c represents the upper body CoM; the joint between the mobile base 140 and the body (or upper body) 190 is considered as having no mass. When the robot is not tilting, the CoM of the upper body and of the mobile base are $c_c$ and $b_c$. The tilt angle is $\psi$; h is the height of $c_c$. This model is stored as a system data-service 213.
- a linear model predictive control law with a discretized time according to a sampling time period T and a number N of predicted samples, expressed as a quadratic optimization formulation with a weighted sum of objectives, and a set of predefined linear constraints. In order to define the dynamic behavior of the controlled body and base (c and b), we have to choose first the duration of the prediction (horizon) and the period between each sampling instant. Choosing a horizon as small as possible and a period as large as possible will reduce the computational time, but will also reduce the stability and the robustness of the control, depending on the dynamic class. To conserve the linearity of the system, we have chosen a polynomial class of order 3 for the body and base trajectories in order to have a continuous CoP trajectory, in order to avoid peak of forces in the robot. Also, in this controller, the time is sampled, with a sampling period T. The number of predicted sample is N. Another advantage of this kind of control is that it is simple to manage with many inequalities constraints, as kinematic limits of the robot, maximum velocity and acceleration of the mobile base and CoP limits. This control law is stored as a system data-service 213 which calls for Motion API.

Calculating position, velocity and acceleration commands entails controlling the tilt angle and the angular velocity of the robot.

The first controller is dedicated to the situation when the robot is not tilting: then the tilt angle is null.

In order to have a real-time control, the model of the robot needs to be as simple as possible. We need to compute a good approximation of the forces acting by the base on the ground. The repartition of the masses in the robot cannot be done by a single point-mass model, because around half of the mass is concentrated in the base, and the rest in the upper body.

We can now write the equations of Newton and Euler for this system, where the axis z is the vertical axe and, x and y the two horizontal axes:

$$m_c(\ddot{c}+g) = F_{b/c} \qquad (1)$$

$$m_b(\ddot{b}+g) = F_{g/b} - F_{b/c} \qquad (2)$$

$$\dot{L}_c = (b-c) \times F_{b/c} \qquad (3)$$

$$\dot{L}_b = (p-b) \times F_{g/b} \qquad (4)$$

where mc and mb are the masses respectively linked to c and b, $\dot{L}_c$ and $\dot{L}_b$ the angular momentums for each point-mass. $F_{b/c}^{xyz}$ corresponds to the forces acting by the mobile base on the upper body and $F_{b/c}^{xyz}$ corresponds to the forces acting by the ground on the three wheels of the mobile base.

Also, p is the CoP of the forces $F_{g/b}^{xyz}$, which is the barycenter of them. Due to its definition, p is only defined in the convex polygon represented by the contact points of the three wheels.

In this model, we consider directly the momentums between c and b (3)(4). This implies that we neglect the momentum induced by the arms. We can do that because in our cases of operation, there are not moving fast. Combining the equations (1)(2)(3)(4), we can write the dynamic equation of the system:

$$\dot{L}_c + \dot{L}_b = (p-b) \times m_b(\ddot{b}+g) + (p-c) \times m_c(\ddot{c}+g) \qquad (5)$$

We can note in the equation (5) that the dynamic equation of a two mass model is simply the sum of two single ones.

Now, in order to linearize the equation (5), we formulate some hypotheses. Firstly, we can neglect the total angular momentum $\dot{L}_c+\dot{L}_b$ because we have chosen to consider only the momentum between c and b. Secondly, because we have a redundant robot, we can move the CoM of c around the axes x and y without modifying its position on the axis z. So we consider $c^z$ constrained at a constant value h; this hypothesis is important to obtain a linear model but the robot can still roll over its base without this hypothesis. Moreover to simplify the description, we preferably consider a planar and horizontal ground, so $p^z=0$. There is no DoF to control the position of $b^z$, we can set it to a constant l. Finally, we can note that $g^x=g^y=0$ and $g^z=g$ the gravity norm.

Using these hypotheses and notes, we can rewrite the equation (5) as follows:

$$m_c g(c^{xy}-p^{xy}) + m_b g(b^{xy}-p^{xy}) = m_c h \ddot{c}^{xy} + m_b l \ddot{b}^{xy} \qquad (6)$$

We can now use the equation (6) in order to provide a linear relation between the CoP and the positions and accelerations of the base and of the body:

$$p^{xy} = \frac{m_c c^{xy} + m_b b^{xy}}{m_c + m_b} - \frac{m_c h \ddot{c}^{xy} + m_b l \ddot{b}^{xy}}{(m_c + m_b)g} \qquad (17)$$

Figure 5:
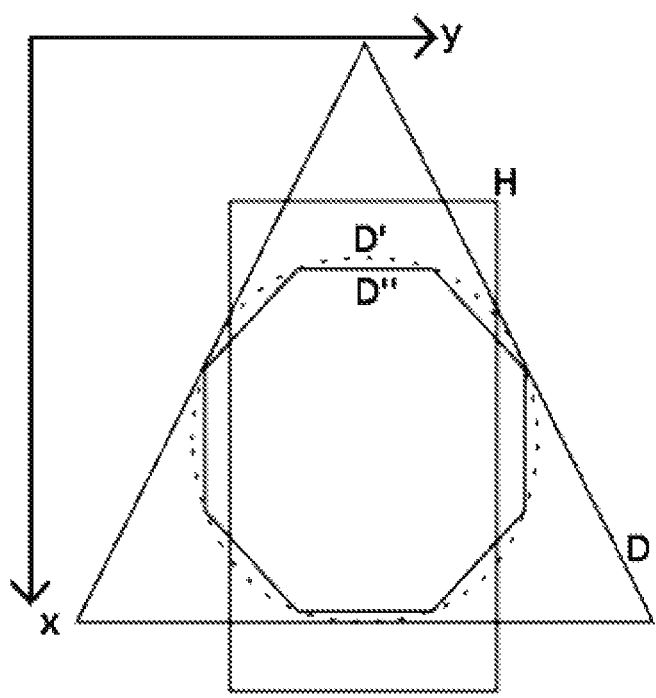
FIG. 5 illustrates a geometrical representation of a constraint, FIG. 6 schematically represents a functional scheme of a supervisor.

We can note that this model does not take into account any possibility of tilting. So, to ensure the validity of the model, a constraint on the CoP must be added to the controller to ensure that the CoP is strictly inside the convex polygon defined by the three wheels of the robot: a robustness criterion is defined. We consider $\mathbb{D}$ the convex polygon represented by the contact point of each wheel with the ground; an example of this D polygon is shown FIG. 5. By definition, we always have $p^{xy} \in \mathbb{D}$. To have a CoP constraint invariant by rotation, in the frame of the robot centered on b, we have designed a conservative constraint: $p^{xy} \in \mathbb{D}'$, where $\mathbb{D}$ is a circle centered on b of radius r, with the property $\mathbb{D}' \in \mathbb{D}$.

Quantifying the robustness of this system is an open question. In the absence of any modelization of the disturbance forces, we cannot make any hypothesis about the direction, the amplitude and their dynamics. The capacity of the robot to compensate a disturbance can be linked to the CoP and the CoM position of c. As they are able to move, the robot can react to a strong disturbance. We can note that, in the absence of any hypothesis on the disturbance, the CoP and the CoM position of c have the most range to move in any direction if they are close to b. So we propose a robustness criteria $\zeta$, which is equal to 0 on the maximum robustness:

$$\zeta = \zeta_f \|p-b\| + (1-\zeta_f)\|c-b\| \tag{8}$$

where $\zeta_f$ is a factor in the range [0; 1] which determines what type of robustness we consider most important, to center the CoP, or to center the CoM of c.

This robot model being defined to address the case when the robot is not tilting, we can address the corresponding control law.

We can write the relation between each state, using the Euler explicit method:

$$c_{k+1}^{xy} = c_k^{xy} + T\dot{c}_k^{xy} + \frac{T^2}{2}\ddot{c}_k^{xy} + \frac{T^3}{6}\dddot{c}_k^{xy} \tag{9}$$

$$\dot{c}_{k+1}^{xy} = \dot{c}_k^{xy} + T\ddot{c}_k^{xy} + \frac{T^2}{2}\dddot{c}_k^{xy} \tag{10}$$

$$\ddot{c}_{k+1}^{xy} = \ddot{c}_k^{xy} + T\dddot{c}_k^{xy} \tag{11}$$

There is an important consequence in the choice of the sampling period T. The trajectory is allowed to be out of the constraints between two samples, because we constrain the trajectory only at each sampling time. For real-time reason, we cannot choose a value for T too small. So it is necessary to take into account this overflow in each constraint as a security margin.

Consider $C^{xy} = (c_1^{xy} \ldots c_N^{xy})^t$, and in the same way for the derivatives of c and for b and p. Also, consider the initial state $\hat{c}^{xy} = (c_0^{xy}\dot{c}_0^{xy}\ddot{c}_0^{xy})^t$, and in the same way for $\hat{b}^{xy}$.

Using the equations (9)(10)(11), we can write the relation between each derivative of the body trajectory (C, Ċ and C̈) and the command C⃛:

$$C^{xy} = U_c \dddot{C}^{xy} + S_c \hat{c}^{xy} \tag{12}$$

$$\dot{C}^{xy} = U_{\dot{c}} \dddot{C}^{xy} + S_{\dot{c}} \hat{c}^{xy} \tag{13}$$

$$\ddot{C}^{xy} = U_{\ddot{c}} \dddot{C}^{xy} + S_{\ddot{c}} \hat{c}^{xy} \tag{14}$$

With:

$$U_c = \begin{pmatrix} \frac{T^3}{6} & 0 & 0 \\ \vdots & \ddots & 0 \\ \frac{(1-3N+3N^2)T^3}{6} & \cdots & \frac{T^3}{6} \end{pmatrix}, S_c = \begin{pmatrix} 1 & T & \frac{T^2}{2} \\ \vdots & \vdots & \vdots \\ 1 & NT & \frac{N^2T^2}{2} \end{pmatrix} \tag{15}$$

$$U_{\dot{c}} = \begin{pmatrix} \frac{T^2}{2} & 0 & 0 \\ \vdots & \ddots & 0 \\ \frac{(2N-1)T^2}{2} & \cdots & \frac{T^2}{2} \end{pmatrix}, S_{\dot{c}} = \begin{pmatrix} 0 & 1 & T \\ \vdots & \vdots & \vdots \\ 0 & 1 & NT \end{pmatrix}$$

$$U_{\ddot{c}} = \begin{pmatrix} T & 0 & 0 \\ \vdots & \ddots & 0 \\ T & \cdots & T \end{pmatrix}, S_{\ddot{c}} = \begin{pmatrix} 0 & 0 & 1 \\ \vdots & \vdots & \vdots \\ 0 & 0 & 1 \end{pmatrix}$$

The same way is used to define the dynamic of b. We can note that $U_c$, $U_{\dot{c}}$ and $U_{\ddot{c}}$ are invertible because they are squared lower triangular matrices with no zero in the diagonal.

Concerning p, using the equation (6), we can write this relation:

$$P^{xy} = U_{pc}\dddot{C}^{xy} + U_{pb}\dddot{B}^{xy} + S_{pc}\hat{c}^{xy} + S_{pb}\hat{b}^{xy} \tag{16}$$

With:

$$U_{pc} = \frac{m_c(gU_c - hU_{\ddot{c}})}{(m_c + m_b)g}, U_{pb} = \frac{m_b(gU_b - lU_{\ddot{b}})}{(m_c + m_b)g} \tag{17}$$

$$S_{pc} = \frac{m_c(gS_c - hS_{\ddot{c}})}{(m_c + m_b)g}, S_{pb} = \frac{m_b(gS_b - lS_{\ddot{b}})}{(m_c + m_b)g}.$$

Among different methods that can be used to solve the problem of determining such a control law fulfilling these position, robustness and dynamic behavior conditions, we have chosen to address it as an optimization problem. And to solve this optimization problem we have chosen to formulate it as a least square minimization under linear constraints or as a quadratic optimization with objectives and linear constraints. The main reason is that the solvers for this kind of problem are fast to compute. Adding non linear constraints or non quadratic minimization objectives increase significantly the computational time.

The optimization variables correspond to the controlled body and base $X = (\dddot{C}^x \dddot{C}^y \dddot{B}^x \dddot{B}^y)^t$. So each objective and constraint must be expressed as a function of X.

1) Control Objectives:

The objectives $O_i$ will be expressed as a least square minimization and a QP (Quadratic Problem) formulation: $O_i = \frac{1}{2}X^tQ_iX + p_i^tX$.

$X^t$ is X when transposed.

The first objective is the tracking control. In this control, we have chosen to do a position/velocity tracking. Let $B_{ref}^{xy}$ and $\dot{B}_{ref}^{xy}$ the position and velocity objective over the horizon. Using (13), we can write the velocity control objective $O_1$:

$$O_1 = \frac{1}{2}\|\dot{B}^{xy} - \dot{B}_{ref}^{xy}\| = \frac{1}{2}X^tQ_1X + p_1^tX \tag{18}$$

$$Q_1 = \begin{pmatrix} 0 & 0 & 0 & 0 \\ 0 & 0 & 0 & 0 \\ 0 & 0 & U_b^tU_b & 0 \\ 0 & 0 & 0 & U_b^tU_b \end{pmatrix}, p_1 = \begin{pmatrix} 0 \\ 0 \\ U_b^t(S_b\hat{b}^x - \dot{B}_{ref}^x) \\ U_b^t(S_b\hat{b}^y - \dot{B}_{ref}^y) \end{pmatrix} \tag{19}$$

Using (12) we can write the position control objective $O_2$:

$$O_2 = \frac{1}{2}\|B^{xy} - B_{ref}^{xy}\| = \frac{1}{2}X^tQ_2X + p_2^tX \tag{20}$$

$$Q_2 = \begin{pmatrix} 0 & 0 & 0 & 0 \\ 0 & 0 & 0 & 0 \\ 0 & 0 & U_b^tU_b & 0 \\ 0 & 0 & 0 & U_b^tU_b \end{pmatrix}, p_2 = \begin{pmatrix} 0 \\ 0 \\ U_b^t(S_b\hat{b}^x - B_{ref}^x) \\ U_b^t(S_b\hat{b}^y - B_{ref}^y) \end{pmatrix} \tag{21}$$

The next objective is the robustness maximization. By minimizing $\zeta$ we maximize the robustness. Let $U_{pbb} = U_{pb} - U_b$. Using (8), (12), (16) we can write the robustness control objective $O_3$:

$$O_3 = \frac{1}{2}\zeta \simeq \frac{1}{2}\|\zeta_f(p-b) + (1-\zeta_f)(c-b)\| \quad (22)$$

$$O_3 = \frac{1}{2}X^t Q_3 X + p_3^t X \quad (23)$$

$$Q_3 = \zeta_f Q_{3p} + (1-\zeta_f) Q_{3c} \quad (24)$$

$$p_3 = \zeta_f p_{3p} + (1-\zeta_f) p_{3c} \quad (25)$$

$$Q_{3p} = \begin{pmatrix} U_{pc}^t U_{pc} & 0 & U_{pc}^t U_{pbb} & 0 \\ 0 & U_{pc}^t U_{pc} & 0 & U_{pc}^t U_{pbb} \\ U_{pbb}^t U_{pc} & 0 & U_{pbb}^t U_{pbb} & 0 \\ 0 & U_{pbb}^t U_{pc} & 0 & U_{pbb}^t U_{pbb} \end{pmatrix}$$

$$p_{3p} = \begin{pmatrix} U_{pc}^t\left((S_{pb}-S_b)\hat{b}^x + S_{pc}\hat{c}^x\right) \\ U_{pc}^t\left((S_{pb}-S_b)\hat{b}^y + S_{pc}\hat{c}^y\right) \\ U_{pbb}^t\left((S_{pb}-S_b)\hat{b}^x + S_{pc}\hat{c}^x\right) \\ U_{pbb}^t\left((S_{pb}-S_b)\hat{b}^y + S_{pc}\hat{c}^y\right) \end{pmatrix}$$

$$Q_{3c} = \begin{pmatrix} U_c^t U_c & 0 & -U_c^t U_b & 0 \\ 0 & U_c^t U_c & 0 & -U_c^t U_b \\ -U_b^t U_c & 0 & U_b^t U_b & 0 \\ 0 & -U_b^t U_c & 0 & U_b^t U_b \end{pmatrix}$$

$$p_{3c} = \begin{pmatrix} U_c^t\left(S_c\hat{c}^x - S_b\hat{b}^x\right) \\ U_c^t\left(S_c\hat{c}^y - S_b\hat{b}^y\right) \\ U_b^t\left(S_c\hat{c}^x - S_b\hat{b}^x\right) \\ U_b^t\left(S_c\hat{c}^y - S_b\hat{b}^y\right) \end{pmatrix}$$

Preferably, we define another objective to avoid peak of jerk on the robot; so we add a jerk minimization objective $O_4$ to the control:

$$O_4 = \tfrac{1}{2}\|X\| = \tfrac{1}{2}X^t Q_4 X + p_4^t X \quad (26)$$

$$Q_4 = \mathcal{I}, p_4 = 0 \quad (27)$$

Concerning this forth objective, we can note that when the robot falls, the trajectories of c and b grow exponentially. So by minimizing the jerk of these trajectories, we directly increase the avoidance of exponential divergence of c and b, which contributes to stabilize the robot.

2) Control Constraints:

In the following the constraints R; will be expressed as a QP linear inequality constraint formulation: $R_i: v_i^- \leq V_i X \leq v_i^+$.

The first constraint R1 is to assure stability, to ensure that the robot will not tilt by itself: $\zeta$ must be lower or equal to 1. This constraint is not linear, so we introduce a conservative set of linear constraints to approximate this. We choose to use an octagonal shape of constraints $\mathbb{D}''$ inscribed in the circle $\mathbb{D}'$ as shown in FIG. 4: it defines a CoP limit constraint. Let $$\rho = \frac{r}{\sqrt{10}}.$$

This constraint R1 which concerns the CoP bounds is written as follows:

$$R_1: P^{xy} - B^{xy} \in \mathbb{D}'' \quad (28)$$

$$V_1 = \begin{pmatrix} U_{dc} & 0 & U_{pb} - U_b & 0 \\ 0 & U_{pc} & 0 & U_{pb} - U_b \\ U_{pc} & U_{pc} & U_{pb} - U_b & U_{pb} - U_b \\ U_{pc} & -U_{pc} & U_{pb} - U_b & -U_{pb} + U_b \end{pmatrix} \quad (29)$$

$$v_1^- = \begin{pmatrix} -3\rho - S_{pc}\hat{c}^x - (S_{pb}-S_b)\hat{b}^x \\ -3\rho - S_{pc}\hat{c}^y - (S_{pb}-S_b)\hat{b}^y \\ -4\rho - S_{pc}(\hat{c}^x + \hat{c}^y) - (S_{pb}-S_b)(\hat{b}^x + \hat{b}^y) \\ -4\rho - S_{pc}(\hat{c}^x - \hat{c}^y) - (S_{pb}-S_b)(\hat{b}^x - \hat{b}^y) \end{pmatrix}$$

$$v_1^+ = \begin{pmatrix} 3\rho - S_{pc}\hat{c}^x - (S_{pb}-S_b)\hat{b}d^x \\ 3\rho - S_{pc}\hat{c}^y - (S_{pb}-S_b)\hat{b}^y \\ 4\rho - S_{pc}(\hat{c}^x + \hat{c}^y) - (S_{pb}-S_b)(\hat{b}^x + \hat{b}^y) \\ 4\rho - S_{pc}(\hat{c}^x - \hat{c}^y) - (S_{pb}-S_b)(\hat{b}^x - \hat{b}^y) \end{pmatrix}$$

The second constraint $R_2$ concerns the kinematic limits of the mobile base. Let $\dot{b}_{max}$ and $\ddot{b}_{max}$ the maximum velocity and acceleration of the mobile base. We can write the constraint $R_2$ as follows:

$$R_2: \begin{cases} -\dot{b}_{max}^{xy} \leq \dot{B}^{xy} \leq \dot{b}_{max}^{xy} \\ -\ddot{b}_{max}^{xy} \leq \ddot{B}^{xy} \leq \ddot{b}_{max}^{xy} \end{cases} \quad (30)$$

$$V_2 = \begin{pmatrix} 0 & 0 & U_{\dot{b}} & 0 \\ 0 & 0 & 0 & U_{\dot{b}} \\ 0 & 0 & U_{\ddot{b}} & 0 \\ 0 & 0 & 0 & U_{\ddot{b}} \end{pmatrix} \quad (31)$$

$$v_2^- = \begin{pmatrix} -\dot{b}_{max} - S_{\dot{b}}\hat{b}^x \\ -\dot{b}_{max} - S_{\dot{b}}\hat{b}^y \\ -\ddot{b}_{max} - S_{\ddot{b}}\hat{b}^x \\ -\ddot{b}_{max} - S_{\ddot{b}}\hat{b}^y \end{pmatrix}, \quad v_2^+ = \begin{pmatrix} \dot{b}_{max} - S_{\dot{b}}\hat{b}^x \\ \dot{b}_{max} - S_{\dot{b}}\hat{b}^y \\ \ddot{b}_{max} - S_{\ddot{b}}\hat{b}^x \\ \ddot{b}_{max} - S_{\ddot{b}}\hat{b}^y \end{pmatrix}$$

The third and last constraint $R_3$ concerns the kinematic limits of the body. Due to its joints, the robot can move the CoM of its upper body in a rectangular zone $\mathbb{H}$ around the CoM of the mobile base. Let $k^{xy}$ the limits of the rectangular shape $\mathbb{H}$, the constraint $R_3$ is written as follows:

$$R_3: -k^{xy} \leq c^{xy} - b^{xy} \leq k^{xy} \quad (32)$$

$$V_3 = \begin{pmatrix} U_c & 0 & -U_b & 0 \\ 0 & U_c & 0 & -U_b \end{pmatrix} \quad (33)$$

$$v_3^- = \begin{pmatrix} -k^x - S_c\hat{c}^x + S_b\hat{b}^x \\ -k^y - S_c\hat{c}^y + S_b\hat{b}^y \end{pmatrix}, \quad v_3^+ = \begin{pmatrix} k^x - S_c\hat{c}^x + S_b\hat{b}^x \\ k^y - S_c\hat{c}^y + S_b\hat{b}^y \end{pmatrix}$$

The kinematic limits of the body can be null. Then we have: $c^{xy} = b^{xy}$.

To solve this optimization problem with these objectives and constraints, we use a linear quadratic problem solver. Some literature about solving a QP can be found in the book "Numerical optimization, second edition" of J. Nocedal and S. J. Wright 2000. This kind of solver finds the optimal solution of a problem like this:

$$\begin{cases} \min_X (X^t Q X + p^t X) \\ v^- \leq VX \leq v^+ \end{cases} \quad (34)$$

where Q is symmetric and positive definite. Using the equations (19), (21), (25), (27), (29), (31), (33), we can fill the values of Q, p, V, $v^-$ and $v^+$:

$$Q = \alpha_1 Q_1 + \alpha_2 Q_2 + \alpha_3 Q_3 + \alpha_4 Q_4 + \alpha_5 Q_5 \quad (35)$$

$$p = \alpha_1 p_1 + \alpha_2 p_2 + \alpha_3 p_3 + \alpha_4 p_4 + \alpha_5 p_5 \quad (36)$$

$$V = \begin{pmatrix} V_1 \\ V_2 \\ V_3 \end{pmatrix}, \quad v^+ = \begin{pmatrix} v_1^+ \\ v_2^+ \\ v_3^+ \end{pmatrix}, \quad v^- = \begin{pmatrix} v_1^- \\ v_2^- \\ v_3^- \end{pmatrix} \quad (37)$$

where $\alpha_i$ are the weightings associated to each objective. They can be chosen experimentally.

The choice of the $\alpha_i$ values is primordial to define the behavior of the control law. The relative gap between each $\alpha_i$ defines which objective will be prioritized, and which will be neglected. If $\alpha_1$ and $\alpha_2$ are greater than the other weightings, the trajectory tracking will be very efficient, but the robustness will be less efficient, and the jerk of the body and of the base can be high. If $\alpha_3$ is greater than the other weightings, the robot will be very robust to strong disturbances. We can note that in this mode of behavior, if we define a positive velocity as tracking objective, the robot will start backwards before moving forward, in order to center the CoP. The weighting $\alpha_4$ has a smoothing effect on the trajectories of c and b, if this weighting is greater than the other, the optimal solution will be not to move. Thereby, this weighting must be small.

Some other behaviors can be obtained by choosing adequate weightings. If the relative gap between two objectives is large (several orders of magnitude), the smaller objective will be computed almost in the null-space of the larger one. Using this property is useful when we want to have a pseudo constraint which can be relaxed if it cannot be satisfied. For example, we can add a high-weighted objective of the CoM of the upper body to center it to the mobile base position in order to have a nice visual behavior. This will have the effect of fixing the CoM at the mobile base position whenever possible, but, in case this is not possible, this pseudo-constraint will be relaxed.

The weighting set can be fixed, which means that we have chosen in advance if we want to have a better trajectory tracking or robustness.

Referring to FIG. 2, the robot model and the control law are stored as a behavior 221; they are implemented by the execution engine 240 and by the service module 210 according to a closed-loop scheme comprising the following steps:

retrieving position measure of the body and position measure of the base, from sensors, converting these position measures in observed position measures, using extractors 211, calculating in a system service 213, body velocity and base velocity commands using the previously described control law, integrating these body and base velocities, to provide them to the extractors 211, converting these commands (position and velocity for the body and for the base) as instructions for the robot actuators 212: the wheels of the base and joints of the robot.

The second controller is dedicated to the situation when the robot is tilting. If the robot is about to tilt owing to a disturbance for example, the model defined in the previous section is not sufficient. We need to take into account the tilt motion in the model as shown FIG. 4: tilt angle $\psi$ is not null. First, we consider that the robot can only tilt on two of its wheels. We do not consider the tilt only around one wheel because the robot looses too much DoF to be properly controlled in that case.

When the robot is tilting, the CoP can only vary on the line between the two contact wheels. In order to minimize the probability to tilt on one wheel, the CoP is constrained to be in the middle of the two contact wheels. Moreover, the mechanical structure of the robot has been made to reduce the risks to tilt on one wheel. During the tilt motion, the robot looses one DoF allowed by the in-air wheel. The result is that the robot becomes non-holonomic. Some constraints in the controller must be added to deal with that.

Consider $v_\psi^{xy}$ the unit vector on the xy-plane and orthogonal to the tilt axis. p is only able to move on the axis defined by $v_\psi$. Also, let $\psi$ the tilt angle. Due to the ground, we have $\psi \geq 0$. We can split c (and respectively b) into two components: a controlled part $c_c$ (and respectively $b_c$) by the motors of the robot, and another part depending on the tilt angle by the following kinematic relations:

$$c^{xy} = c_c^{xy} + v_\psi^{xy} d_c \sin(\psi) \quad (38)$$

$$\dot{c}^{xy} = \dot{c}_c^{xy} + v_\psi^{xy} (\dot{c}_c \sin(\psi) + d_c \dot{\psi} \cos(\psi)) \quad (39)$$

$$\ddot{c}^{xy} = \ddot{c}_c^{xy} + v_\psi^{xy} (\ddot{d}_c \sin(\psi) + 2\dot{d}_c \dot{\psi} \cos(\psi) + d_c \ddot{\psi} \cos(\psi) - d_c \dot{\psi}^2 \sin(\psi)) \quad (40)$$

$$c^z = h + d_c \sin(\psi) \quad (41)$$

$$\dot{c}^z = \dot{d}_c \sin(\psi) + d_c \dot{\psi} \cos(\psi) \quad (42)$$

$$\ddot{c}^z = \ddot{d}_c \sin(\psi) = 2\dot{d}_c \dot{\psi} \cos(\psi) + d_c \ddot{\psi} \cos(\psi) - d_c \dot{\psi}^2 \sin(\psi) \quad (43)$$

with $d_c = \|c_c^{xy} - p^{xy}\|$.

In order to simplify these relations, we make two assumptions:

$d_c$ can be considered constant because the motion of $c_c^{xy} - p^{xy}$ relative to $\psi$ is negligible during the transitional tilt motion;

as usual, we neglect the Coriolis effects relative to the centrifugal effects: $\ddot{\psi} \cos(\psi) \gg \dot{\psi}^2 \sin(\psi)$. So, the equations can be rewritten as follows:

$$c^{xy} = c_c^{xy} + v_\psi^{xy} d_c \sin(\psi) \quad (44)$$

$$\dot{c}^{xy} = \dot{c}_c^{xy} + v_\psi^{xy} d_c \dot{\psi} \cos(\psi) \quad (45)$$

$$\ddot{c}^{xy} = \ddot{c}_c^{xy} + v_\psi^{xy} d_c \ddot{\psi} \cos(\psi) \quad (46)$$

$$c^z = h + d_c \sin(\psi) \quad (47)$$

$$\dot{c}^z = d_c \dot{\psi} \cos(\psi) \quad (48)$$

$$\ddot{c}^z = d_c \ddot{\psi} \cos(\psi) \quad (49)$$

Finally, we linearise these equations around $\psi = 0$, considering that the tilt angle will stay close to 0. Also, we can consider that $h \gg d_c \sin(\psi)$, when $\psi \simeq 0$. The equations become:

$$c^{xy} = c_c^{xy} + v_\psi^{xy} d_c \psi \quad (50)$$

$$\dot{c}^{xy} = \dot{c}_c^{xy} + v_\psi^{xy} d_c \dot{\psi} \quad (51)$$

$$\ddot{c}^{xy} = \ddot{c}_c^{xy} + v_\psi^{xy} d_c \ddot{\psi} \quad (52)$$

$$c^x = h \tag{53}$$

$$\ddot{c}^z = 0 \tag{54}$$

$$\dddot{c}^z = 0 \tag{55}$$

and in the same way for b, replacing $d_c$ by $d_b$ and h by I. Now, using (7)(50)(52)(53)(55), we can rewrite the equation of the dynamic as follows:

$$p^{xy} = \frac{m_c(c_c^{xy} + v_\psi^{xy} d_c \psi) + m_b(b_c^{xy} + v_\psi^{xy} d_b \psi)}{m_c + m_b} - \frac{m_c h(\ddot{c}_c^{xy} + v_\psi^{xy} d_c \ddot{\psi}) + m_b l(\ddot{b}_c^{xy} + v_\psi^{xy} d_b \ddot{\psi})}{(m_c + m_b)g} \tag{56}$$

We notice that when the angular velocity is null (which means that the robot is in a no-tilt state), we obtain the equation (7) of the robot modelization described in relation with the no-tilt controller.

We have chosen to constraint the position of p in the middle of the two contact wheels. So, p is entirely defined by the following relation:

$$p = b_c + v_\psi d_c \tag{57}$$

Using (56)(57), we can now express the link between $\psi$ and its derivative with the other variables:

$$\psi(m_c d_c + m_b d_b) v_\psi - \ddot{\psi} \frac{m_c h d_c + m_b l d_b}{g} v_\psi = m_c(c_c - b_c) - \frac{m_c h \ddot{c}_c + m_b l \ddot{b}_c}{g} - (m_c + |m_c|) d_c v_\psi \tag{58}$$

This robot model with tilt being defined, we can address the corresponding control law.

We use the same formalism as in the previous section. So we can define the trajectories of $\psi$:

$$\Psi^{xy} = U_\psi \ddot{\Psi}^{xy} + S_\psi \hat{\psi}^{xy} \tag{59}$$

$$\dot{\Psi}^{xy} = U_{\dot\psi} \ddot{\Psi}^{xy} + S_{\dot\psi} \hat{\psi}^{xy} \tag{60}$$

$$\ddot{\Psi}^{xy} = U_{\ddot\psi} \mathbb{D} + S_{\ddot\psi} \hat{\psi}^{xy} \tag{61}$$

with $\Psi^{xy} = (\psi_1^{xy} \ldots \psi_N^{xy})^t$
and $\hat{\psi}^{xy} = (\psi_0^{xy} \dot\psi_0^{xy} \ddot\psi_0^{xy})^t$.

Using these relations and the equation (58), we have:

$$(U_\psi \ddot{\Psi} + S_\psi \hat{\psi})(m_c d_c + m_b d_b) v_\psi - (U_{\ddot\psi} \ddot{\Psi} + S_{\ddot\psi} \hat{\psi}) \frac{m_c h d_c + m_b l d_b}{g} v_\psi = m_c(C - B) - \frac{m_c h \ddot{C} + m_b l \ddot{B}}{g} - (m_c + m_c) d_c v_\psi \tag{62}$$

We can note that we have a direct linear relation between $\ddot\Psi$ and C, $\ddot{C}$, B and $\ddot{B}$ using the equations (59) (61):

$$\ddot\Psi = \left( U_\psi (m_c d_c + m_b d_b) v_\psi - U_{\ddot\psi} \frac{m_c h d_c + m_b l d_b}{g} v_\psi \right)^{-1}$$

$$\left( m_c(C - B) - \frac{m_c h \ddot{C} + m_b l \ddot{B}}{g} - (m_c + m_c) d_c v_\psi - \right. \tag{63}$$

$$\left. S_\psi \hat{\psi}(m_c d_c + m_b d_b) v_\psi + S_{\ddot\psi} \hat{\psi} \frac{m_c h d_c + m_b l d_b}{g} v_\psi \right)$$

And in a synthetic form:

$$\ddot\Psi = U_{\ddot\Psi c} \ddot{C} + U_{\ddot\Psi b} \ddot{B} + S_{\ddot\Psi c} \hat{c} + S_{\ddot\Psi b} \hat{b} \tag{64}$$

This relation is valid only if the matrix:

$$\left( U_\psi (m_c d_c + m_b d_b) v_\psi - U_{\ddot\psi} \frac{m_c h d_c + m_b l d_b}{g} v_\psi \right)$$

is invertible. $U_\psi$ and $U_{\ddot\psi}$ are two lower triangular matrices with constant diagonal of value $$\frac{T^3}{6}$$

and T the sampling period. So, the invertibility is valid only if:

$$\frac{T^3}{6}(m_c d_c + m_b d_b) v_\psi - T \frac{m_c h d_c + m_b l d_b}{g} v_\psi \neq 0 \tag{65}$$

Solving this system, we have a condition on T to allow the invertibility of this matrix (we assume that T>0):

$$T \neq \sqrt{\frac{m_c h d_c + m_b l d_b}{g(m_c d_c + m_b d_b)}} \tag{66}$$

For the robot according to the invention with the features described in the preamble in relation with FIG. 1 we have T≠220 ms.

To solve this problem we use the same formalism as in the previous section (the robot is not tilting). The optimization variables remain the same because despite adding the new variable $\psi$, we have constrained the CoP p to be at one point. So the number of variables to solve the problem is unchanged:

$$X = (\ddot{C}^x \ddot{C}^y \ddot{B}^x \ddot{B}^y)^t$$

1) Control Objectives:

The first objective is to minimize the norm of iv, in order to recover the tilt. We can express the relation between $\Psi$ and X:

$$\Psi = U_\psi U_{\ddot\Psi c} \ddot{C} + U_\psi U_{\ddot\Psi b} \ddot{B} + U_\psi S_{\ddot\Psi c} \hat{c} + U_{104} S_{\ddot\Psi b} \hat{b} + S_\psi \hat{\psi} \tag{67}$$

$$\Psi = U_{\psi c} \ddot{C} + U_{\psi b} \ddot{B} + S_{\psi c} \hat{c} + S_{\psi b} \hat{b} + S_\psi \hat{\psi} \tag{68}$$

With:

$$U_{\psi c} = U_\psi U_{\ddot\Psi c}$$

$$U_{\psi b} = U_\psi U_{\ddot\Psi b}$$

$$S_{\psi c} = U_\psi S_{\ddot\Psi c}$$

$$S_{\psi b} = U_\psi S_{\ddot\Psi b}$$

Now, we can write this objective $O_1$:

$$O_1 = \frac{1}{2}\|\Psi\| = \frac{1}{2}X^tQ_1X + p_1^tX \quad (70)$$

$$Q_1 = \begin{pmatrix} U_{\dot\psi c}^t U_{\dot\psi c} & 0 & U_{\dot\psi c}^t U_{\dot\psi b} & 0 \\ 0 & U_{\dot\psi c}^t U_{\dot\psi c} & 0 & U_{\dot\psi c}^t U_{\dot\psi b} \\ U_{\dot\psi b}^t U_{\dot\psi c} & 0 & U_{\dot\psi b}^t U_{\dot\psi b} & 0 \\ 0 & U_{\dot\psi b}^t U_{\dot\psi c} & 0 & U_{\dot\psi b}^t U_{\dot\psi b} \end{pmatrix}$$

$$p_1 = \begin{pmatrix} U_{\dot\psi c}^t(S_{\dot\psi c}\hat{c}^x + S_{\dot\psi b}\hat{b}^x + S_\psi\hat\psi) \\ U_{\dot\psi c}^t(S_{\dot\psi c}\hat{c}^y + S_{\dot\psi b}\hat{b}^y + S_\psi\hat\psi) \\ U_{\dot\psi b}^t(S_{\dot\psi c}\hat{c}^x + S_{\dot\psi b}\hat{b}^x + S_\psi\hat\psi) \\ U_{\dot\psi b}^t(S_{\dot\psi c}\hat{c}^y + S_{\dot\psi b}\hat{b}^y + S_\psi\hat\psi) \end{pmatrix} \quad (71)$$

The second objective is the tilt velocity minimization. In order to land with the lowest angular velocity, to avoid rebounds as much as possible and to minimize mechanical impacts, it is important to minimize the angular velocity during the tilt. We can express the relation between $\dot\psi$ and X:

$$\dot\psi = U_{\dot\psi} U_{\dddot\psi c} \dddot{C} + U_{\dot\psi} U_{\dddot\psi b}\dddot{B} + U_{\dot\psi}S_{\dddot\psi c}\hat{c} + U_{\dot\psi}S_{\dddot\psi b}\hat{b} + S_{\dot\psi}\hat\psi \quad (72)$$

$$\dot\psi = U_{\dot\psi c}\dddot{C} + U_{\dot\psi b}\dddot{B} + S_{\dot\psi c}\hat{c} + S_{\dot\psi b}\hat{b} + S_{\dot\psi}\hat\psi \quad (73)$$

Now we can write this objective $O_2$:

$$O_2 = \frac{1}{2}\|\Psi\| = \frac{1}{2}X^tQ_2X + p_2^tX \quad (74)$$

$$Q_2 = \begin{pmatrix} U_{\dot\psi c}^t U_{\dot\psi c} & 0 & U_{\dot\psi c}^t U_{\dot\psi b} & 0 \\ 0 & U_{\dot\psi c}^t U_{\dot\psi c} & 0 & U_{\dot\psi c}^t U_{\dot\psi b} \\ U_{\dot\psi b}^t U_{\dot\psi c} & 0 & U_{\dot\psi b}^t U_{\dot\psi b} & 0 \\ 0 & U_{\dot\psi b}^t U_{\dot\psi c} & 0 & U_{\dot\psi b}^t U_{\dot\psi b} \end{pmatrix}$$

$$p_2 = \begin{pmatrix} U_{\dot\psi c}^t(S_{\dot\psi c}\hat{c}^x + S_{\dot\psi b}\hat{b}^x + S_\psi\hat\psi) \\ U_{\dot\psi c}^t(S_{\dot\psi c}\hat{c}^y + S_{\dot\psi b}\hat{b}^y + S_\psi\hat\psi) \\ U_{\dot\psi b}^t(S_{\dot\psi c}\hat{c}^x + S_{\dot\psi b}\hat{b}^x + S_\psi\hat\psi) \\ U_{\dot\psi b}^t(S_{\dot\psi c}\hat{c}^y + S_{\dot\psi b}\hat{b}^y + S_\psi\hat\psi) \end{pmatrix} \quad (75)$$

The third objective is for numerical stability, in a similar way with the case without tilt:

$$O_3 + \tfrac{1}{2}\|X\| = \tfrac{1}{2}X^tQ_3X + p_3^tX \quad (76)$$

$$Q_3 = \mathcal{I},\ p_3 = 0 \quad (77)$$

2) Control Constraints:

In the following, the constraints will be expressed as a QP linear equality constraint formulation: $R_i: v_i^- \leq V_i X \leq v_i^+$.

The first constraint concerns the kinematic limits of the mobile base. Let $\dot{b}_{max}$ and $\ddot{b}_{max}$ the maximum velocity and acceleration of the mobile base, we can write the constraint $R_2$ as follows:

$$R_1: \begin{cases} -\dot{b}_{max}^{xy} \leq \dot{B}^{xy} \leq \dot{b}_{max}^{xy} \\ -\ddot{b}_{max}^{xy} \leq \ddot{B}^{xy} \leq \ddot{b}_{max}^{xy} \end{cases} \quad (78)$$

$$V_1 = \begin{pmatrix} 0 & 0 & U_{\dot{b}} & 0 \\ 0 & 0 & 0 & U_{\dot{b}} \\ 0 & 0 & U_{\ddot{b}} & 0 \\ 0 & 0 & 0 & U_{\ddot{b}} \end{pmatrix}$$

$$v_1^- = \begin{pmatrix} -\dot{b}_{max} - S_{\dot{b}}\hat{b}^x \\ -\dot{b}_{max} - S_{\dot{b}}\hat{b}^y \\ -\ddot{b}_{max} - S_{\ddot{b}}\hat{b}^x \\ -\ddot{b}_{max} - S_{\ddot{b}}\hat{b}^y \end{pmatrix},\ v_1^+ = \begin{pmatrix} \dot{b}_{max} - S_{\dot{b}}\hat{b}^x \\ \dot{b}_{max} - S_{\dot{b}}\hat{b}^y \\ \ddot{b}_{max} - S_{\ddot{b}}\hat{b}^x \\ \ddot{b}_{max} - S_{\ddot{b}}\hat{b}^y \end{pmatrix} \quad (79)$$

The second constraint concerns the kinematic limits of the upper body. Due to its joints, the robot can move the CoM of its upper body in a rectangular zone around the CoM of the mobile base. Let $k^{xy}$ the limits of the rectangular shape $\mathbb{H}$, the constraint $R_2$ is written as follows:

$$R_2:\ -k^{xy} \leq c^{xy} - b^{xy} \leq k^{xy} \quad (80)$$

$$V_2 = \begin{pmatrix} U_c & 0 & -U_b & 0 \\ 0 & U_c & 0 & -U_b \end{pmatrix}$$

$$v_2^- = \begin{pmatrix} -k^x - S_c\hat{c}^x + S_b\hat{b}^x \\ -k^y - S_c\hat{c}^y + S_b\hat{b}^y \end{pmatrix},\ v_2^+ = \begin{pmatrix} k^x - S_c\hat{c}^x + S_b\hat{b}^x \\ k^y - S_c\hat{c}^y + S_b\hat{b}^y \end{pmatrix} \quad (81)$$

The third constraint corresponds to the presence of the ground, which imply that the tilt angle is always positive:

$$R_3: \psi \geq 0 \quad (82)$$

$$V_3 = (U_{\dot\psi c}\ U_{\dot\psi c}\ U_{\dot\psi b}\ U_{\dot\psi b})v_3^- = (-S_{\dot\psi c}\hat{c}^{xy} - S_{\dot\psi b}\hat{b}^{xy} - S_\psi\hat\psi),$$
$$v_3^+ = (+\infty) \quad (83)$$

The last constraint means taking into account the DoF loss of the mobile base. It is only possible to move b on the $v_\psi$ axis. The constraint $R_4$ is written as follows:

$$R_4: v_\psi^t \times \dot{b}^{xy} = 0 \quad (84)$$

$$V_4 = (-v_\psi^y U_{\dot{b}}\ v_\psi^x U_{\dot{b}}\ 0\ 0)v_4^- = (-S_{\dot{b}}(v_\psi^x - v_\psi^y)) \quad (85)$$

$$v_4^+ = (-S_{\dot{b}}(v_\psi^x - v_\psi^y)) \quad (86)$$

The third controller is dedicated to the landing phase. It is the same as the first controller (no-tilt state), but without the two tracking control objectives and with the constraint $R_4$ of the tilt controller. More precisely, the objectives are:

an objective related to the distance between the CoP and the base center, CoP being the barycenter of contact forces between the robot and the ground, and a numerical stability objective.

A base velocity objective can be added to these objectives. The constraints are:

a maximum velocity and acceleration of the mobile base kinematics limits of the body a CoP limit a move of the body only on the angular velocity axis.

Figure 6:
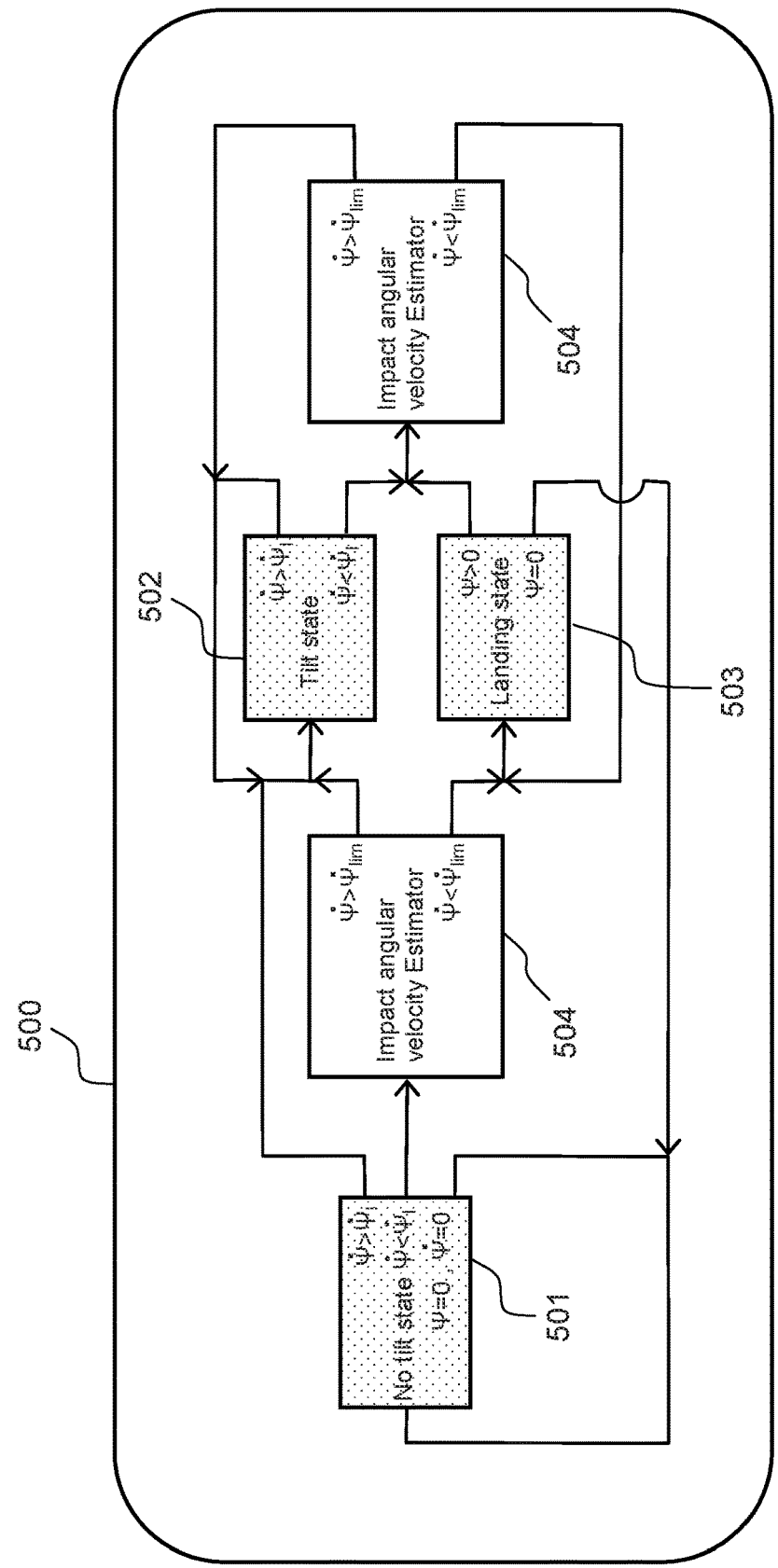

In the lifetime of the robot, we have to choose which controller (shown in FIG. 6) to use:

The first one 501 to control the robot when it is not tilting.

The second one 502 used when the robot is tilting, in order to recover the disturbance.

The third 503 one used when the robot is in landing phase.

According to these controllers we define three states for the robot:
- The non-tilt state, when the first controller 501 is activated.
- The tilt state, when the second controller 502 is activated.
- The landing state, when the third controller 503 is activated.

We have developed an estimator 504 in order to predict the future behavior of the robot when it is tilting by estimating the landing impact time and the impact angular velocity as described further.

As shown on FIG. 4, at each sampling time a supervisor 500 chooses one of these three states according to the following steps.

Initially, the robot is in non-tilt state.

At each sampling time we measure the tilt angle and the tilt velocity: if one of them is greater than zero, we use the estimator to estimate the impact angular velocity and the impact time.

A) When the robot is in non-tilt state.
- If there is no estimated impact time (unstable motion), switch to the tilt state, because the robot is not able to recover without doing anything.
- If the impact angular velocity is too high for the security of the robot (=the impact angular velocity is above a pre-defined limit1), switch to the tilt state, in order to reduce the impact angular velocity.
- If the measured angular velocity is too high (=the measured angular velocity is above a pre-defined limit2), whatever the estimated impact velocity, switch to the tilt state. This condition is intended to have less delay to compensate a strong push. We assume that if a high angular velocity is measured, this is because someone pushes the robot in order to bring it down.
- Else, there is no need to recover the angle, but if the tilt angle is not null, switch to the landing state because the robot has lost one DoF due to the in-air wheel.
- Else if the tilt angle is null stay in this state.

B) When the robot is in tilt state.

In this state, the second controller is activated to minimize the tilt angle and tilt angular velocity of the robot. In this model, we do not modelize the ground that will add a force to compensate the tilt motion at the impact. Controlling the angle at 0 makes the robot acceleration at a too high speed, in order to compensate the gravity acting on the robot at this angle. So we do not need to wait until the tilt is finished to stop using this controller.
- If the measured angular velocity is too high (=the measured angular velocity is above a pre-defined limit2), whatever the estimated impact velocity, stay in this state;
- If the estimated impact velocity is behind the limit, switch to landing state;
- Else, stay in this state.

C) When the robot is in landing state.

This state manages a smooth transition between the tilt state and the non-tilt state, firstly to avoid high base acceleration due to the non modelized ground in the tilt controller, and secondly in order to let the in-air wheel fall and the robot recover the lost DoF before reactivating the non-tilt state.
- If there is no estimated impact time, or if the impact angular velocity is too high, or if the measured angular velocity is too high, switch in the tilt state;
- If the tilt angle fall to 0, wait a little amount of time, in case of a rebound appears, then if not, switch to the non-tilt state;
- Else, stay in this state.

We describe now the estimator. We have developed an estimator in order to know if the robot will fall or not, and if not, which will be the impact angular velocity. Using the current measured tilt angle $\psi_0$ and angular velocity $\dot{\psi}_0$, we assume that we have a constant acceleration $$\ddot{\psi} = -\frac{g}{d_b}\cos\left(\psi_0 + \operatorname{atan}\left(\frac{l}{d_b}\right)\right).$$

When the tilt angle $\psi$ is 0, the angle between the CoM of the mobile base and the tilt contact point is $$\operatorname{atan}\left(\frac{l}{d_b}\right).$$

This assumption means that the mobile base will stop to accelerate. As this estimator is used to know if we can use the landing mode (which control the acceleration of the mobile base to 0), considering a constant angular acceleration is valid. We can solve the quadratic associated system, in order to find the contact time $t_i$ and if it exists, to compute the angular velocity at this moment $\dot{\psi}_i$:

$$\dot{\psi} = -\frac{gt\cos\left(\psi_0 + \operatorname{atan}\left(\frac{l}{d_b}\right)\right)}{d_b} + \dot{\psi}_0 \quad (87)$$

$$\psi = -\frac{gt^2\cos\left(\psi_0 + \operatorname{atan}\left(\frac{l}{d_b}\right)\right)}{2d_b} + \dot{\psi}_0 t + \psi_0 \quad (88)$$

If $$\Delta = \dot{\psi}_0^2 + \frac{2g\psi_0\cos\left(\psi_0 + \operatorname{atan}\left(\frac{l}{d_b}\right)\right)}{d_b} < 0,$$

we have no impact. We can note that this can occur only if $$\psi_0 > \frac{\pi}{2} - \operatorname{atan}\left(\frac{l}{d_b}\right).$$

Else, the impact time $t_i$ can be computed:

$$t_i = \frac{d_b(-\dot{\psi}_0 \pm \sqrt{\Delta})}{g} \quad (89)$$

Obviously, we choose the solution where $t_i > 0$. And so, the estimated impact velocity $\dot{\psi}_i$ is:

$$\dot{\psi}_i = -\frac{gt_i}{d_b} + \dot{\psi}_0 \quad (90)$$

The estimator and the supervisor can also be stored as a system data-service 213.

The invention claimed is:

1. A humanoid robot with a body joined to an omnidirectional mobile ground base, equipped with:
   a body position sensor, a base position sensor and an angular velocity sensor to provide measures,
   actuators comprising joints motors and at least 3 wheels located in the omnidirectional mobile base, with at least one omnidirectional wheel,
   extractors for converting sensored measures,
   a supervisor to calculate position, velocity and acceleration commands from the extracted data,
   means for converting commands into instructions for the actuators,
   wherein the supervisor comprises:
      a no-tilt state controller, a tilt state controller and a landing state controller, each controller comprising means for calculating from the extracted data, pre-ordered position and velocity references, and a tilt angle and angular velocity references set to 0, position, velocity and acceleration commands based on a double point-mass robot model and on a linear model predictive control law with a discretized time according to a sampling time period T and a number N of predicted samples, expressed as a quadratic optimization formulation with a weighted sum of objectives, and a set of predefined linear constraints,
      an impact angular velocity and a landing impact time estimator and
      means for choosing a controller according to an estimated impact angular velocity and extracted angular velocity.

2. The humanoid robot of claim 1, wherein the base has a constant angular acceleration.

3. The humanoid robot of claim 1, wherein the no-tilt controller is based on a no-tilt robot model and is able to calculate position, velocity and acceleration commands from the extracted data using pre-ordered references, and in that the objectives are:
   a base position objective,
   a base velocity objective,
   an objective related to the distance between the CoP and the base center, CoP being the barycenter of contact forces between the robot and the ground,
   and the constraints are:
      a maximum velocity and acceleration of the mobile base,
      a CoP limit.

4. The humanoid robot of claim 1, wherein the tilt controller is based on a robot model with tilt motion and is able to calculate position, velocity and acceleration commands from the extracted data using pre-ordered references and a tilt angle and angular velocity references set to 0, and in that the objectives are tilt angle minimization and angular velocity minimization and the constraints are kinematic limits of the mobile base, kinematic limits of the body, a positive tilt angle and a move of the body only on the angular velocity axis.

5. The humanoid robot of claim 3, wherein a weighted numerical stability objective is added to the weighted sum of objectives.

6. The humanoid robot of claim 1, wherein the landing controller is based on a no-tilt robot model and is able to calculate position, velocity and acceleration commands from the extracted data using pre-ordered references and a tilt angle and angular velocity references set to 0, and in that the objectives are an objective related to the distance between the CoP and the base center, CoP being the barycenter of contact forces between the robot and the ground, and a numerical stability objective, the constraints are a maximum velocity and acceleration of the mobile base and kinematics limits of the body and a CoP limit and a move of the body only on the angular velocity axis.

7. The humanoid robot of claim 1, wherein a base velocity objective is added to the weighted sum of objectives.

8. The humanoid robot of claim 3, wherein the constraints comprise kinematics limits of the body.

9. A method for controlling a humanoid robot with a body joined to an omnidirectional mobile ground base, with actuators comprising at least three wheels with at least one omnidirectional wheel comprising:
   retrieving position measure of the body, position measure of the base, tilt angle of the robot and angular velocity measure of the robot, at pre-defined sampling times,
   converting these measures in extracted data,
   estimating an impact angular velocity and a landing impact time;
   choosing a state of the robot among a defined tilt-state, or no-tilt state or landing state of the robot according to said impact angular velocity and landing impact time;
   using the extracted data, and, according to said state of the robot pre-ordered position and velocity references, and a title angle and angular velocity references set to 0, calculating position, velocity and acceleration commands based on a double point-mass robot model and on a linear model predictive control law with a discretized time according to a sampling time period T and a number N of predicted samples, and expressed as a quadratic optimization formulation with a weighted sum of objectives with predefined weights and a set of linear constraints using respectively:
      a tilt state control law if the state of the robot is the tilt-state;
      a no-tilt state control law if the state of the robot is the no-tilt state;
      a landing state control law if the state of the robot is the landing state;
   converting these commands into instructions for the robot actuators; and
   sending said instructions to said robot actuators.

10. The method of claim 9, wherein the state of the robot is defined according to the following steps:
   if one among the tilt angle measure and/or the angular velocity measure is greater than zero, estimating an estimated impact angular velocity and an estimated impact time,
   initially, placing the robot is in the no-tilt state,
   when the robot is in the no-tilt state:
      if there is no estimated impact time, switching to the tilt state;
      if the impact angular velocity is above a pre-defined limit1, switching to the tilt state;
      if the measured angular velocity is above a pre-defined limit2, switching to the tilt state;
      else, if the tilt angle is not null, switching to the landing state,
      if the tilt angle is null staying in the no-tilt state,
   when the robot is in the tilt state:
      if the measured angular velocity is above the pre-defined limit2, staying in the tilt state;
      if the estimated impact velocity is under a pre-defined limit1, switching to the landing state;
      else, staying in tilt state, when the robot is in the landing state:
- if there is no estimated impact time, switching to the tilt state;
- if the impact angular velocity is above a pre-defined limit1, switching to the tilt state;
- if the measured angular velocity is above a pre-defined limit2, switching to the tilt state;
- if the tilt angle falls to 0, and if an angular velocity measured at a next time is null, switching to the non-tilt state, else, staying in the landing state.

11. A computer program linked to actuators of a humanoid robot with a body joined to an omnidirectional mobile ground base, with actuators comprising at least three wheels with at least one omnidirectional wheel, said computer program comprising computer code fit for executing when running on a computer a method comprising:
- retrieving position measure of the body, position measure of the base, tile angle of the robot and angular velocity measure of the robot, at pre-defined sampling times,
- converting these measures in extracted data,
- estimating an impact angular velocity and a landing impact time,
- choosing a state of the robot among a defined tilt-state, or non-tilt state or landing state of the robot according to said impact angular velocity and landing impact time,
- using the extracted data, and, according to said state of the robot pre-ordered position and velocity references, and a tilt angle and angular velocity references set to 0, calculating position, velocity and acceleration commands based on a double point-mass robot model and on a linear model predictive control law with a discretized time according to a sampling time period T and a number N or predicted samples, and express as a quadratic optimization formulation with a weighted sum of objectives with predefined weights and a set of linear constraints using respectively:
  - a tilt-state control law if the state of the robot is the tilt state;
  - a no-tilt state control law if the state of the robots is the no-tilt state;
  - a landing state control law if the state of the robot is the landing state;
- converting these commands into instructions for the robot actuators;
- sending said instructions to said robot actuators.

* * * * *